United States Patent

Clar et al.

Patent Number: 5,193,632
Date of Patent: Mar. 16, 1993

[54] VEHICLE WITH MOTORIZED PROPULSION UNITS

[75] Inventors: Georges Clar, Lyons; Olivier Carra, Peyrins; Patrice Feuillet, Marcy l'Etoile, all of France

[73] Assignee: Framatome, Courbevoie, France

[21] Appl. No.: 727,045

[22] Filed: Jul. 9, 1991

[30] Foreign Application Priority Data

Jul. 9, 1990 [FR] France .................. 90 08692

[51] Int. Cl.⁵ .......................... B62D 55/00; B25J 5/00
[52] U.S. Cl. ................................. 180/91; 180/9.32; 180/65.6; 901/1
[58] Field of Search ................ 180/9.1, 9.32, 9.64, 180/9.62, 65.5; 901/1

[56] References Cited

U.S. PATENT DOCUMENTS

| | | | |
|---|---|---|---|
| 3,730,287 | 5/1973 | Fletcher et al. ................... | 180/9.1 |
| 4,389,586 | 6/1983 | Foster et al. . | |
| 4,702,331 | 10/1987 | Hagihara et al. . | |
| 4,932,491 | 6/1990 | Collins, Jr. ........................ | 180/9.32 |
| 4,932,831 | 6/1990 | White et al. ...................... | 180/9.32 X |
| 4,977,971 | 12/1990 | Crane, III et al. ............... | 180/9.32 X |
| 5,111,898 | 5/1992 | Argouarc'h ....................... | 180/9.1 X |

FOREIGN PATENT DOCUMENTS 2529157 7/1987 France .

Primary Examiner—Margaret A. Focarino
Assistant Examiner—Kevin Hurley
Attorney, Agent, or Firm—Pollock, Vande Sande & Priddy

[57] ABSTRACT

A transverse axis tubular hub (24) couples each elongate propulsion unit (4) to the vehicle body (2). It supplies signals representative of the forces that it transmits. A tilt motor (22) of said propulsion unit bears on said hub to tilt said propulsion units about said transverse axis. In accordance with the invention a drive motor is disposed on said axis.

The invention is particularly applicable to working in environments harmful to man.

5 Claims, 7 Drawing Sheets

VEHICLE WITH MOTORIZED PROPULSION UNITS

The present invention concerns a vehicle designed to operate in the absence of a human operator, especially in buildings.

It finds a particular application in industrial installations where work needs to be carried out that would be dangerous or impossible for a human operator. A vehicle in accordance with the present invention may then be used. It may be provided with appropriate instruments such as video cameras, measuring instruments and tools, so constituting a robot.

A robot in accordance with the present invention can be especially useful in a nuclear power plant or in a nuclear fuel reprocessing plant when it is necessary to inspect or carry out repairs in areas subject to high levels of ionising radiation after a malfunction. Robots of this kind can be equally useful in other industries, for example in the chemicals industry where there is a risk of explosion, or for security or site surveillance purposes, or in the context of service robots, for example in cleaning, in agriculture or in military operations.

An important property of a vehicle of this kind is its ability to travel over rough ground. The obstacles to be surmounted in this case can be of highly diverse forms, for example a staircase designed for humans which the vehicle must travel up or down, or a pipe fallen onto a floor. There are two main aspects to the security of such vehicles when surmounting such obstacles. One is stability, that is to say the ability of the vehicle not to topple over due to its own weight and that of its payload. The other is grip and relates to each of the propulsion units of the vehicle, by which is meant the members which rest on the ground to support and displace or immobilise the vehicle. The "grip" of a propulsion unit is its ability not to slip excessively in contact with the ground, even if the surface state of the ground is locally unfavourable.

Another important property of a vehicle of this kind is its compactness: its overall dimensions, especially in the transverse and longitudinal directions, must preferably be sufficiently small for the vehicle to travel through narrow passages or corridors in a building designed only to admit a human operator.

Another important property is that the vehicle should be as light as possible.

Various vehicles have been designed to have a good ability to surmount obstacles safely.

A known vehicle has four elongate tracked propulsion units which can tilt relative to the vehicle body. The track on each propulsion unit is guided by a number of guide members, including two sprocket wheels one of which is a drive sprocket wheel for driving the track. These units are carried by a propulsion unit body which is assembled to the vehicle body in such a way as to enable the propulsion unit to tilt about a transverse axis. The vehicle body carries drive and tilt motors for rotating the drive sprocket wheels through mechanical transmission systems and for driving the tilting movements of the propulsion units, respectively. These motors are provided with brakes for controlling these movements. The vehicle body further carries batteries for supplying electrical power and motor control means.

This known vehicle was designed by the Japanese company Mitsubishi and is known as the MRV (Multifunctional Robot Vehicle). It is described on pages 425 and 426 of the report on the "85 ICAR International Conference on Advanced Robotics, September 9-10, 1985, Tokyo, Japan organised by: Robotics Society of Japan, The Society of Biomechanisms, Japan Industrial Robot Association".

It would seem to be able to surmount known shape obstacles. However, to enable this it must be controlled by a human operator who can see it, even if from a distance. Also, it would not seem to offer the important properties previously mentioned to a sufficient degree.

An object of the present invention is to provide a simple vehicle able to surmount safely varied obstacles whilst having a limited transverse overall dimension enabling it to navigate passages designed for persons. It is also directed to enabling the mounting of tools on the vehicle to constitute a robot able to carry out work in various buildings, especially if an accident has rendered the premises inaccessible to a human operator.

To this end, its object is a vehicle with motorised propulsion units characterised in that a drive motor of a propulsion unit is accommodated in a transverse tubular hub about which said propulsion unit can be tilted relative to the body of the vehicle by motorised tilt means inside said propulsion unit and outside said hub, on which they bear.

The manner in which the present invention can be put into effect will now be described with reference to the appended diagrammatic drawings, on the understanding that the parts and arrangements described and shown are described and shown by way of non-limiting example only. If the same part is shown in more than one FIGURE it always carries the same reference symbol.

Figure 3:
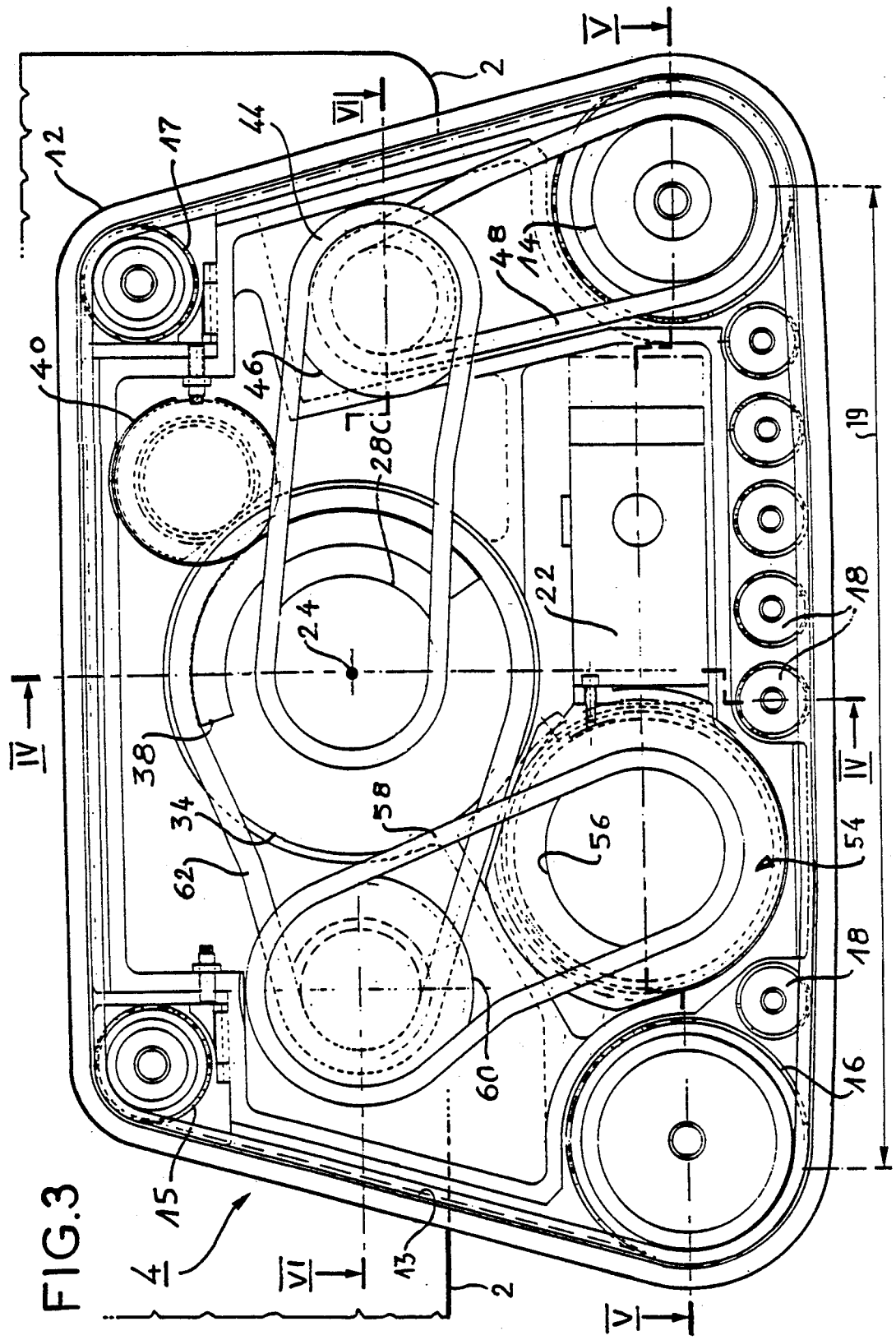
FIG. 3 is a side view of a propulsion unit of the same vehicle, exterior walls of which have been removed to show the internal parts.
Figure 4:
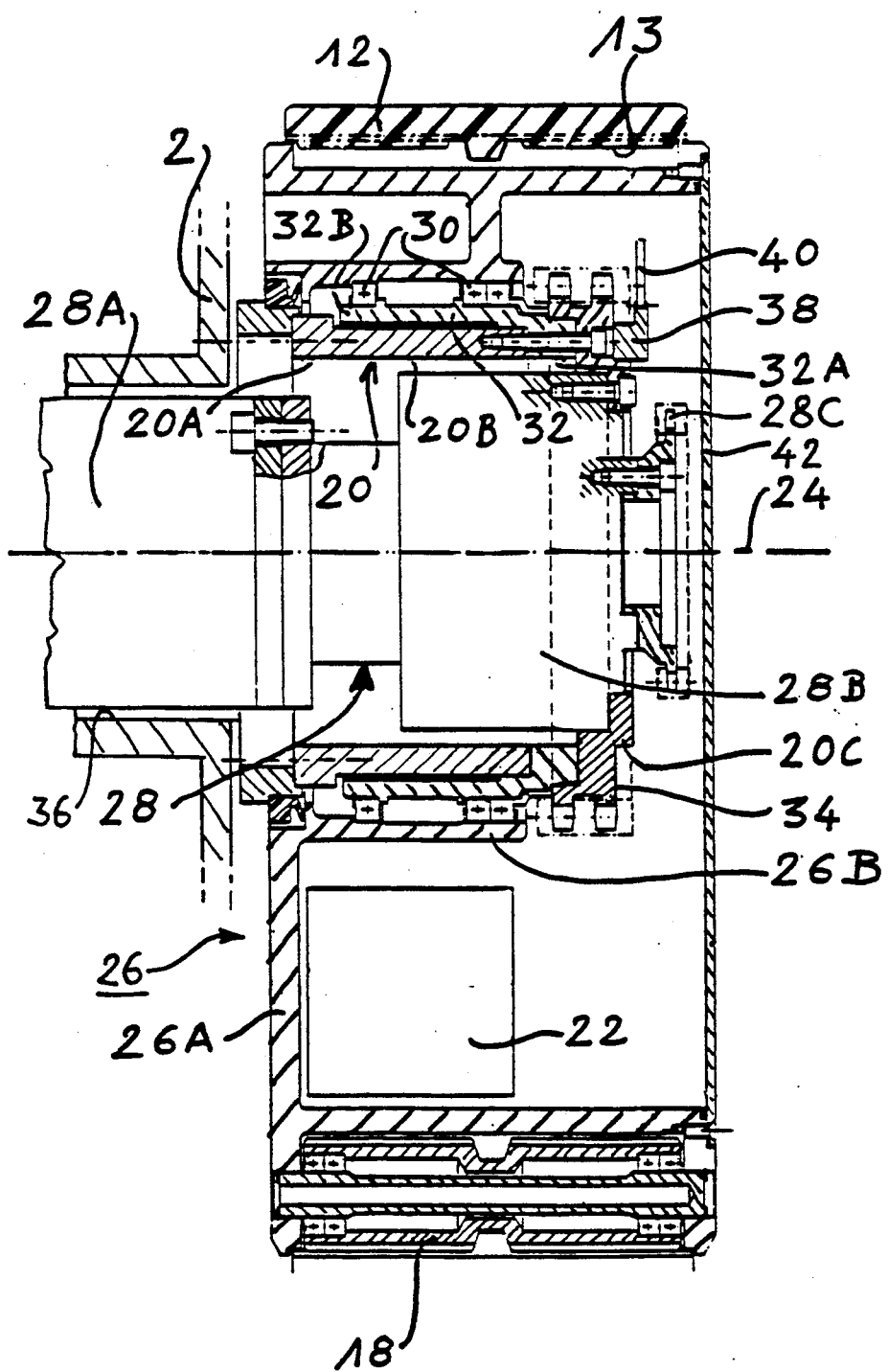

FIGS. 4., 5 and 6 are views of the propulsion unit in cross-section on the respective lines IV—IV, V—V and VI—VI in FIG. 3.

Figure 7:
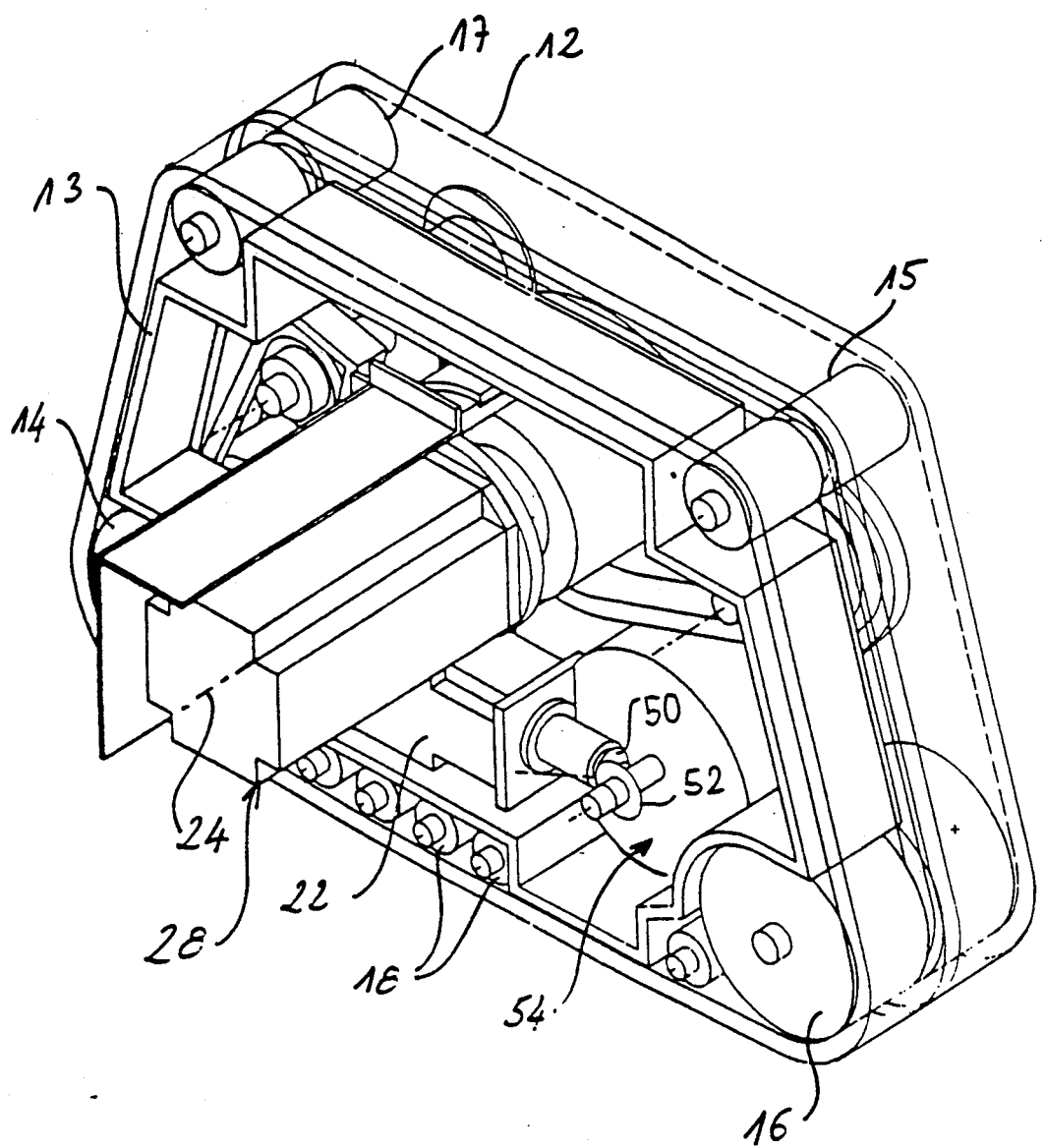
Figure 8:
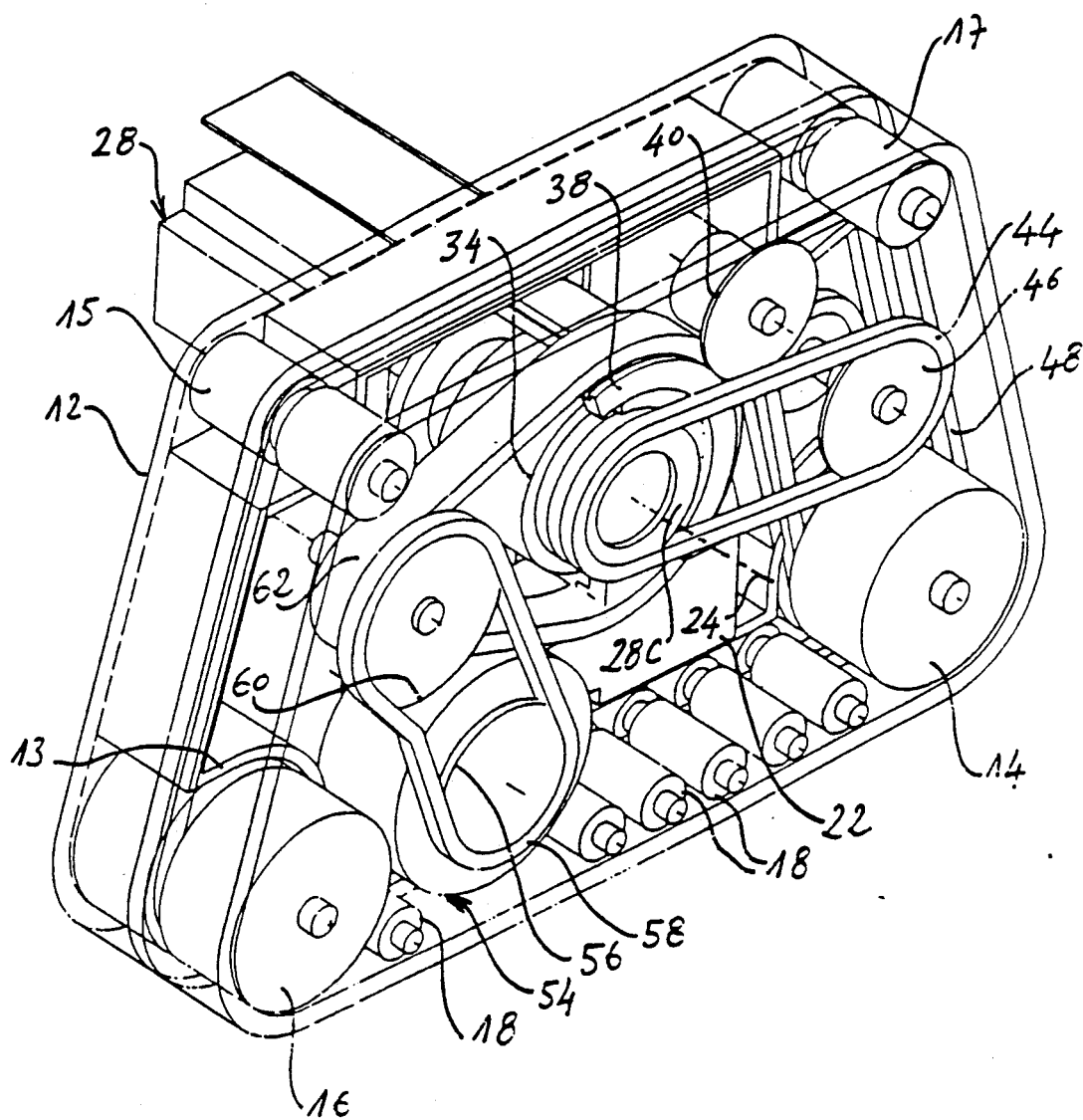

FIGS. 7 and 8 are perspective views of the propulsion unit after the exterior walls have been removed.

Figure 1:
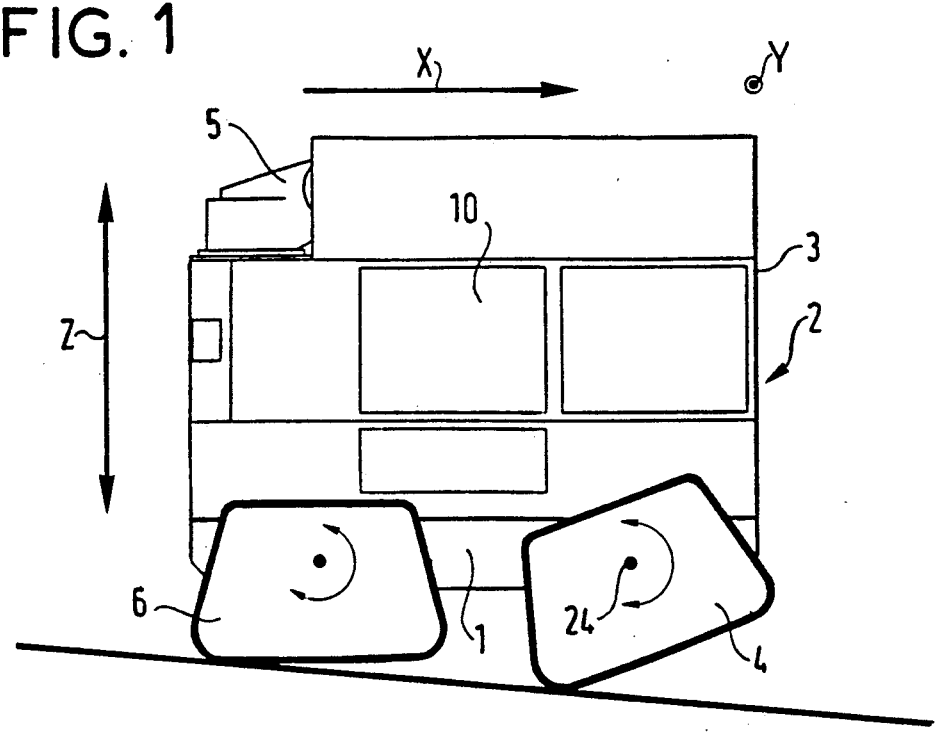
FIG. 1 is a side view of vehicle in accordance with the present invention.
Figure 2:
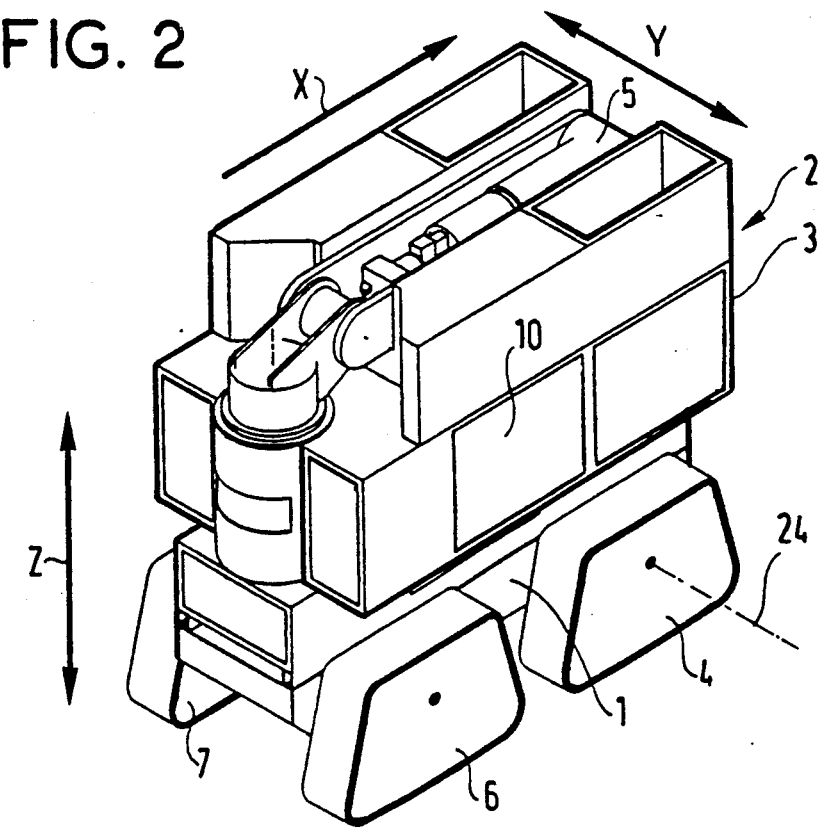
FIG. 2 is a perspective view of the same vehicle.

Referring to FIGS. 1 and 2, an autonomous guided vehicle in accordance with the present invention includes a vehicle body 2 whose lower part 1 is mounted on four tiltable and removable propulsion units (only three of which propulsion units 4, 6 and 7 can be seen in these FIGURES) by means of which the vehicle moves in a longitudinal direction X. FIG. 3 shows that each propulsion unit is provided to this end with a centrally guided track 12 which is driven by a drive sprocket wheel 14 and supported by an idler sprocket wheel 16 and by rollers 18, etc. Two intermediate diameter idler wheels 15 and 17 change the direction of the track at the upper corners of the closed loop that it forms. The body 2 carries in its lower part electrical batteries whose great weight and low position contribute to the stability of the vehicle.

The upper part 3 of the body 2 is wider than the lower part in a transverse direction Y. It carries various units some of which are relatively light, including signal processing means 10, communication means, power electronic devices and sensors and an inertial system (not shown). This upper part also carries a remote manipulator arm 5. The arrow Z represents the vertical direction of the vehicle.

The transverse overall dimension of the upper body is equal to that of the lower body plus the propulsion units, in order to provide sufficient volume without increasing the transverse overall dimension of the vehicle.

A general description will now be given of various advantageous features adopted on this vehicle.

Each of the propulsion units 4, etc includes, in the known manner:

a propulsion unit body 26 supporting the various component parts of the propulsion unit, a ground bearing system 12, 14, 16 supporting the propulsion unit body and having a ground bearing area 15 which extends along the longitudinal direction X and to both ends of which a ground bearing point of this system can move (this system comprises the track 12, the sprocket wheels 14 and 16 and the rollers 18, etc, its ground bearing area 15 extending from the sprocket wheel 14 to the sprocket wheel 16), a drive motor 28 driving the ground bearing system to propel the propulsion unit body 26, a propulsion unit coupling structure 20 coupling the propulsion unit body 26 to the vehicle body 2 so as to support the latter while enabling the propulsion unit body to tilt relative to the vehicle body by rotation about a tilt axis 24 parallel to the transverse direction Y, which tilting movement displaces said ground bearing point, a tilt motor 22 which bears on the coupling structure 20 to drive said tilting movement of the propulsion unit body 26, and force sensors 20B supplying signals representative of the forces applied to the propulsion unit 4 by the ground.

The force signals obtained in this way are transmitted to the signal processing means 10 by known means (not shown).

In accordance with a new arrangement, the coupling structure 20 of each propulsion unit 4, etc includes:

an attachment part 20A attached to the vehicle body 2, possibly through a suspension system (not shown), a support part 20C supporting the propulsion unit body 26 through ball bearings 30 to enable said tilting movement, the support part providing a bearing to enable the tilt motor 22 to drive these movements, and a measurement part 20B coupling the attachment and support parts and incorporating several of said force sensors.

The coupling structure is in the form of a generally tubular propulsion unit hub 20. The hub has an axis on the tilt axis 24 and extends transversely from the vehicle body 2 towards the exterior of the vehicle. It enters the propulsion unit where it ends at its support part 20C.

The support part 20C carries a transversely outermost end 32A of a rigid external hub 32 which extends from this end to a transversely innermost end 32B, surrounding the measurement hub 20 coaxially. The external hub 32 carries on its external surface bearings 30 which support the propulsion unit body 26.

The drive motor 28 is at least partially accommodated in the interior of the propulsion unit hub 20 and is fixed to the support part 20C of this hub. The motor drives a gear 28C which rotates about the tilt axis 24 and is situated, in said transverse direction Y, beyond a transversely outermost end 20C of the hub.

The drive motor 28 has a mechanical part in the form of a speed reducer 28B carried by the support part 20C of the hub 20 of the propulsion unit 4 and an electromechanical part. The latter is in the form of an electric motor 28A carried by the speed reducer 28B and situated in a housing 36 formed in the vehicle body 2 in line with the propulsion unit hub 20.

The support part 20C of the propulsion unit hub 20 carried at least one sector of a tilt marker ring 38, said propulsion unit body 26 carrying a tilt sensor 40 which cooperates with said tilt marker ring to supply to the signal processing means 10 a tilt signal representative of the tilt angle of the propulsion unit 4.

The measurement part 20B of the coupling structure 20 includes at least one vertical force sensor FZ measuring the force applied to the structure in a vertical direction Z of the vehicle body, a longitudinal force sensor FX measuring the force applied to this structure in the longitudinal direction X and a transverse torque sensor MY measuring the moment of a pair of forces applied to this structure about the tilt axis Y. In more detail, the measurement part is constituted by a known type "6 - component" sensor which additionally measures the transverse force FY and the moments MX and MZ of the torques applied about longitudinal and vertical axes so that the three components of the general resultant force are measured as are the three components of the moment resulting from all the forces which are applied to the propulsion unit by the vehicle body 2.

The drive sprocket wheel 28C and a chain 44 drive a group of intermediate sprocket wheels 46 which, through a chain 48, drive the drive sprocket wheel 14. These chains can be seen in FIGS. 3 and 8 in particular.

Figure 5:
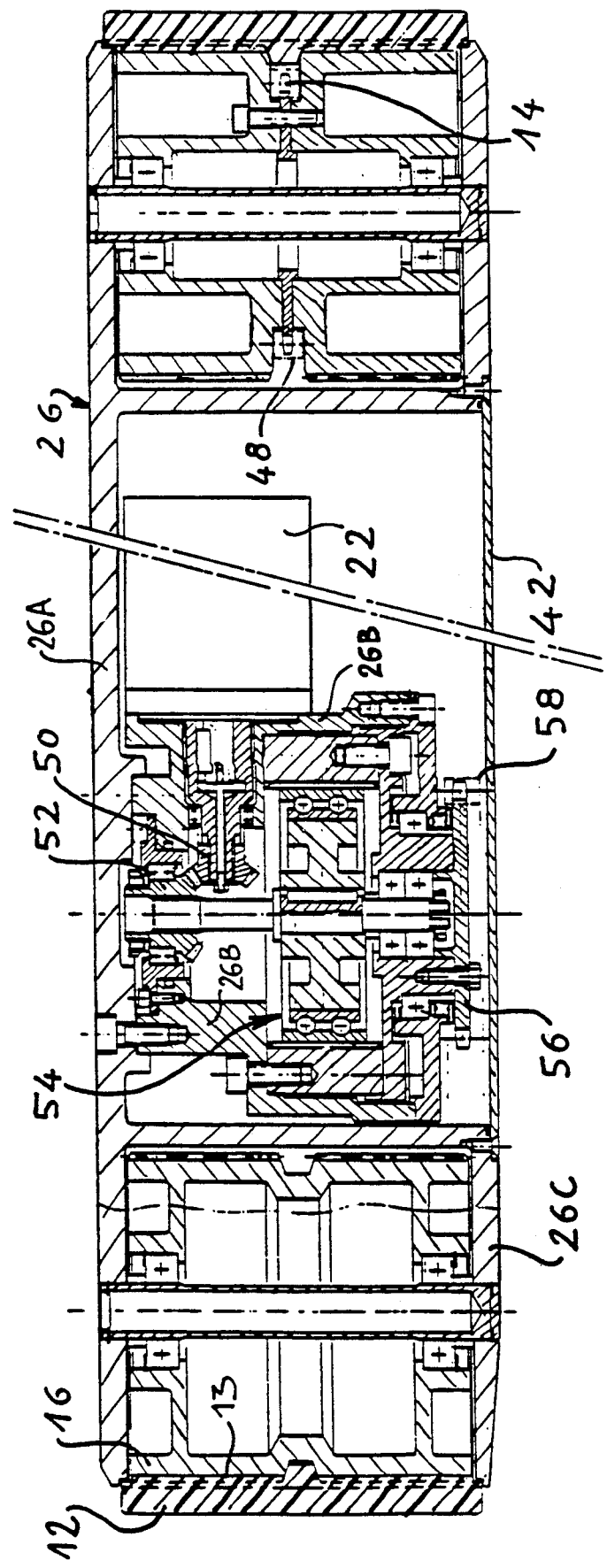
Figure 6:
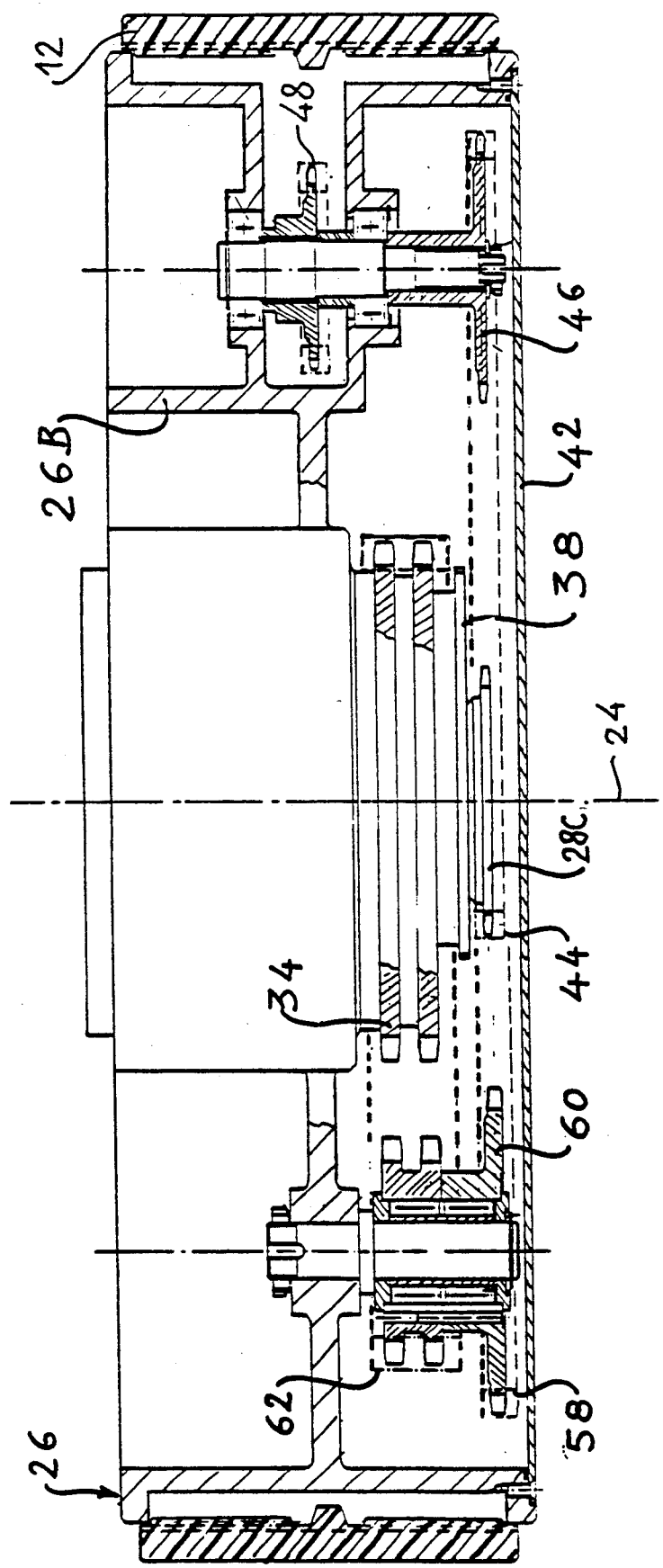

Referring to FIGS. 5 and 7, the tilt motor 22 drives a speed reducer 54 through a pair of right-angle gears 50 and 52. The speed reducer 54 drives a sprocket wheel 56. By means of a chain 58 the sprocket wheel 56 drives a group of intermediate sprocket wheels 60 which drive a chain 62. The sprocket wheels 14 and 16 and the sprocket wheels and gears 46, 50, 52, 56 and 60 are mounted on bearings carried by supports 26B, etc in the form of transversely outwardly projecting parts on the rigid inside flank 26A of the propulsion unit body 26. The chains 44, 48, 58 and 62 are provided with tensioning rollers which deflect the chains as shown, although they are not shown themselves. As shown in FIG. 8 in particular, the chain 62 bears on a tilt bearing toothed sector 34 to drive the tilt movement of the propulsion unit.

The propulsion unit body 22 is of welded or cast construction in light alloy and its width in the transverse direction Y is equal to that of the track 12. It forms an internal flank 26A, an external flank 26C and a closed-loop strip 13 fastening together these two flanks. An opening in the external flank is covered by an exterior cover 42. The track 12 runs around this frame in contact with the strip 13, which carries an anti-friction coating which is also applied to notches on the inside of the track 12 enabling it to be driven by the sprocket wheel 14.

The propulsion unit which has just been described in part has the following complementary advantages and characteristics:

The six-component sensor constituting the measurement part 20B enables all forces exerted on the propulsion unit 4 to be referred to a single point. Because of this sensor and the corresponding sensors in the other propulsion units, all forces applied to the vehicle in all directions in space are known at all times, so that the vehicle equilibrium conditions are known. The fact that the vehicle is equipped with integrated sensors makes it possible to simplify the design of the vehicle as compared with a vehicle provided with force sensors distributed in numerous different areas of its structure. Data acquisition is therefore virtually instantaneous and data processing time is reduced, whereas in a distributed sensor autonomous guided vehicle data acquisition is very slow because the signals have to be processed by a powerful computer. This is because the sensors have varying efficiencies, depending on their position, which falsify the measurements, cause spreading when the signals are processed and seriously limit the performance of the computer.

The risk of sensor failure is reduced in the case of an integrated sensor as compared with the use of multiple sensors to fulfil the same functions.

Also, the arrangements adopted in this vehicle in accordance with the present invention make it possible to accommodate the drive means (the drive motor and transmission, including the chains 44 and 48) and the tilt means (the tilt motor and transmission including the chains 58 and 62) within the confined space of a propulsion unit of a vehicle that is required to be compact. These arrangements achieve this result without compromising the efficiency of the drive and tilt means and without requiring special design or costly drive and tilt means.

At least some propulsion units are removable and preferably interchangeable, said hub of each removable propulsion unit being removably mounted on said vehicle body.

A vehicle as described is simple and easy to manufacture and represents a considerable saving in weight, significantly improving vehicle performance.

The central guiding of the track 12 increases the stability of the vehicle through improved retention eliminating the risk of track-shedding in operation.

Also, the design of the propulsion unit is such that:
its walls form a water-tight enclosure, sealed against splashing of sea water in particular,
it is rendered explosion-proof by a slight increase in pressure in the modules housing all the electrical and electronic transmission parts of the mechanical assemblies.

We claim:
1. A vehicle comprising:
(a) a vehicle body; and
(b) a plurality of propulsion units for supporting and propelling said vehicle body, each of said propulsion units being elongated along a longitudinal direction thereof for propelling said vehicle body along said longitudinal direction, each of said propulsion units comprising:
(i) a coupling structure borne by said vehicle body and having a tubular shape around a transverse tilt axis of each of said propulsion units for coupling each of said propulsion units to said vehicle body. while enabling each of said propulsion units to tilt about said transverse tilt axis;
(ii) a motorized tilt means mounted on each of said propulsion units and bearing on said coupling structure for tilting themselves and each of said propulsion units about said tilt axis; and
(iii) drive motor means located inside said coupling structure for driving each of said propulsion units.

2. Vehicle according to claim 1 comprising:
a vehicle body (2) having a lengthwise longitudinal axis (X) and a widthwise transverse axis (Y), and propulsion units (4, 6, 7) to support said vehicle body and to propel it in said longitudinal direction, each of said propulsion units (4) comprising:
a propulsion unit body (26) to support the component parts of said propulsion unit,
a ground bearing system (12, 14, 16) supporting said propulsion unit body and having a ground bearing area (19) which extends in said longitudinal direction and to both ends of which a ground bearing point of said ground bearing system can move,
a drive motor (28) driving said ground bearing system to propel said propulsion unit body,
a propulsion unit coupling structure (20) coupling said propulsion unit body (26) to said vehicle body (2) to support the latter while enabling said propulsion unit body to tilt relative to said vehicle body by rotating about a tilt axis (24) parallel to said transverse direction, which tilting movement displaces said ground bearing point,
and a tilt motor (22) adapted to bear on said coupling propulsion unit body (26), said vehicle being characterised in that said coupling structure is formed by a propulsion unit hub (20) having an axis on said tilt axis (24) and extending transversely from said vehicle body (2) towards the exterior of the vehicle into the volume of said propulsion unit (20C), said drive motor (28) being at least partially inside said propulsion unit hub (20) and fixed thereto, said motor driving a drive sprocket (28C) which rotates about said tilt axis (24) and is disposed, in said transverse direction (Y), beyond a transversely outermost end (20C) of said hub.

3. Vehicle according to claim 2, characterised in that said drive motor (28) has a mechanical part in the form of a speed reducer (28B) carried by a support part (20C) of said propulsion unit hub (20) inside said hub, and an electromechanical part in the form of an electric motor (28A) carried by said speed reducer and accommodated in a housing (36) formed in said vehicle body (2) in line with said propulsion unit hub (20).

4. Vehicle according to claim 3 characterised in that said support part (20C) of said propulsion unit hub (20) carries a transversely outermost end (32A) of a rigid external hub (32) which extends from this said transversely outermost end to an transversely innermost end (32B) surrounding coaxially said propulsion unit hub, said external hub carrying on its external surface bearings (30) which supports the propulsion unit body (26).

5. Vehicle according to claim 4 characterised in that said support part (20C) of said propulsion unit hub (20) carries externally a tilt bearing member (34) providing a bearing to enable said tilt motor (22) to drive said tilt movement.

* * * * *